(12) United States Patent
Zweifel

(10) Patent No.: US 7,340,967 B2
(45) Date of Patent: Mar. 11, 2008

(54) DEVICE FOR MEASURING A MASS FLOW RATE OF A PARTICULATE MATERIAL

(75) Inventor: Yves Zweifel, La Tour-de-Peilz (CH)

(73) Assignee: Maillefer SA, Ecublens (CH)

( * ) Notice: Subject to any disclaimer, the term of this patent is extended or adjusted under 35 U.S.C. 154(b) by 22 days.

(21) Appl. No.: 11/334,400

(22) Filed: Jan. 19, 2006

(65) Prior Publication Data

US 2006/0169057 A1 Aug. 3, 2006

(30) Foreign Application Priority Data

Jan. 31, 2005 (EP) ................... 05100617

(51) Int. Cl.
*G01F 1/28* (2006.01)
*G01G 11/14* (2006.01)

(52) U.S. Cl. .............. 73/861.71; 73/861.73; 177/16; 250/573

(58) Field of Classification Search ............. 73/861.71
See application file for complete search history.

(56) References Cited

U.S. PATENT DOCUMENTS

| | | | | |
|---|---|---|---|---|
| 4,838,738 A | * | 6/1989 | Salter et al. ................... | 406/14 |
| 5,002,140 A | | 3/1991 | Neumuller | |
| 5,576,499 A | * | 11/1996 | Davies ..................... | 73/861.41 |
| 5,685,640 A | * | 11/1997 | Goedicke et al. ........... | 366/107 |
| 5,986,553 A | * | 11/1999 | Young ........................ | 340/606 |
| 6,013,921 A | | 1/2000 | Möller et al. | |
| 6,241,935 B1 | * | 6/2001 | Beane et al. ................. | 264/437 |
| 6,404,344 B1 | * | 6/2002 | Young ........................ | 340/606 |
| 6,526,120 B1 | * | 2/2003 | Gray et al. ................... | 378/57 |
| 6,732,597 B1 | | 5/2004 | Brandt, Jr. | |
| 6,802,434 B2 | * | 10/2004 | Johnson et al. ................ | 222/1 |

FOREIGN PATENT DOCUMENTS

| | | |
|---|---|---|
| DE | 29 50 925 | 11/1980 |
| DE | 198 20 709 A1 | 11/1998 |
| DE | 199 47 394 A1 | 5/2001 |
| EP | 0 213 524 A2 | 3/1987 |

* cited by examiner

*Primary Examiner*—Harshad Patel
(74) *Attorney, Agent, or Firm*—Oliff & Berridge, PLC

(57) ABSTRACT

A device for measuring a mass flow rate of a flow of particulate material which moves in a predetermined direction. The device includes a weighing cell, a first apparatus, a second apparatus, and a third apparatus. The weighing cell includes a tubular wall and is disposed to be passed through by a flow of particulate material. The first apparatus weighs the weighing cell and the quantity of particulate material contained in the weighing cell and produces a first signal. The second apparatus measures the speed of flow of the particulate material which flows through the weighing cell and produces a second signal. The third apparatus calculates the bulk density of the particulate material, calculates the mass flow rate of particulate material which flows through the weighing cell, and produces a third signal representing the mass flow rate of particulate material which flows through the weighing cell.

9 Claims, 1 Drawing Sheet

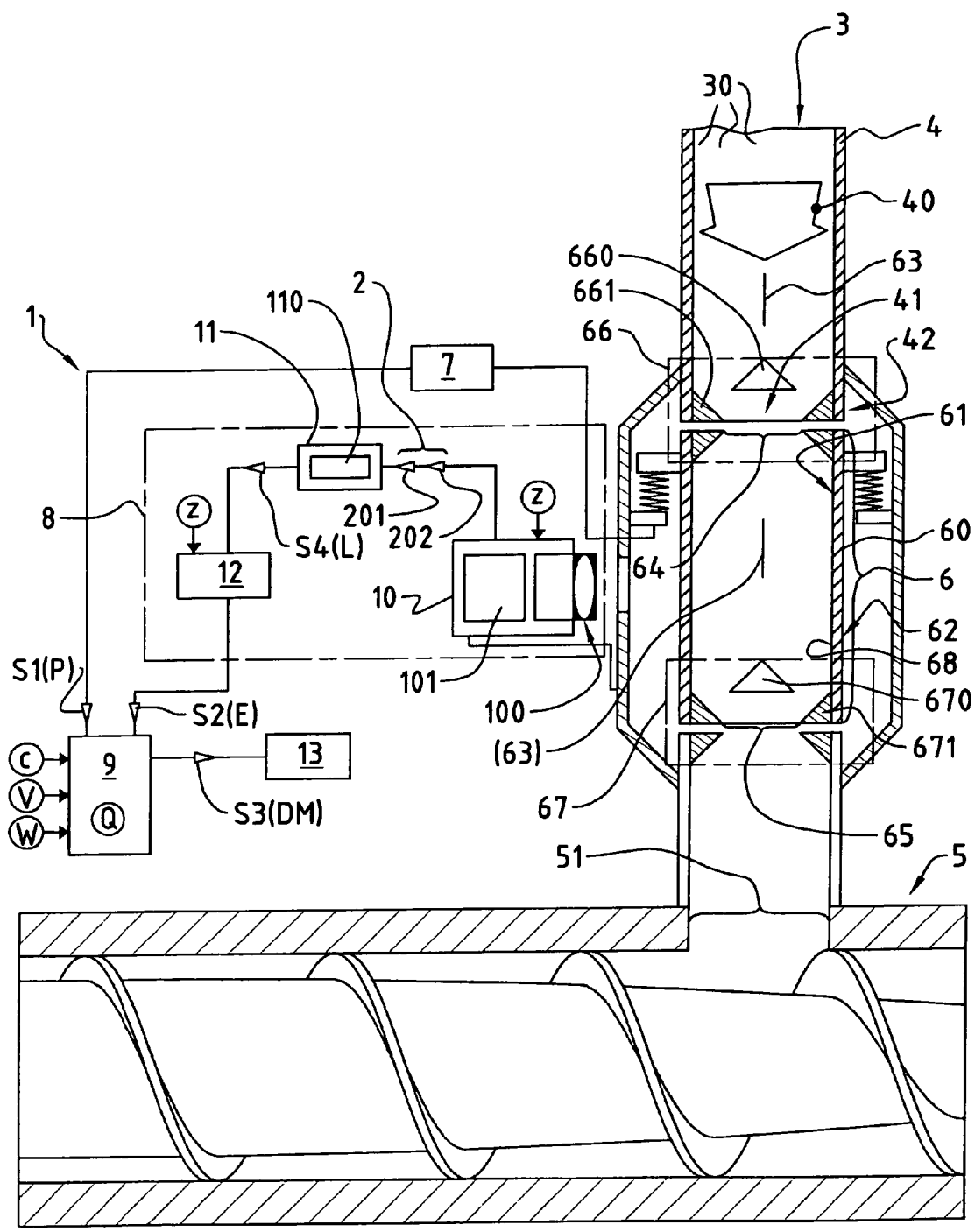

DEVICE FOR MEASURING A MASS FLOW RATE OF A PARTICULATE MATERIAL

BACKGROUND OF THE INVENTION

This Application claims priority from EP 05100617.9 filed Jan. 31, 2005, the entire disclosure of which is incorporated herein by reference thereto.

1. Field of the Invention

The invention relates to a device for measuring a mass flow rate of a flow of particulate material which moves in a predetermined direction, said predetermined direction of flow.

The invention relates more specifically to a device for measuring a mass flow rate of a component introduced in an extruder, such as the main component, but also for measuring the mass flow rate of additional components such as colour masterbatches, if used in combination with a dosing system.

Designated by particulate material is particularly, but not exclusively, pellets, reground material, coarse powder, plastic masterbatch.

The invention is very useful for measuring the particulate material consumption rate of a machine such an extruder.

Measuring the mass flow rate of each component introduced in an extruder is particularly important when the components are used to extrude a plurality of superposed layers and when the thickness of each layer is difficult or impossible to measure on the extrusion line.

2. Description of the Background Art

Different devices are known for measuring a mass flow rate of a particulate material such as described in U.S. Pat. No. 6,732,597 and EP-A-0213524. These devices are generally based on "loss-in-weight" measurements of a hopper, and good accuracy is only possible when weight difference in the measuring hopper is sufficiently large compared to the total hopper weight.

SUMMARY OF THE INVENTION

An object of the invention is to obtain a device which makes it possible to measure the mass flow rate over a short period of time with an increased accuracy.

The use of such a device for measuring a mass flow rate with an increased accuracy is particularly important with a low flow rate, or during flow rate transitions.

Another object of the invention is a device for measuring a mass flow rate, which is compact, of a simple mechanical construction, robust and easy to clean.

To achieve these objects the invention has as its subject matter a device for measuring a mass flow rate of a flow of particulate material which moves in a predetermined direction, the predetermined direction of flow, the device being characterized in that it is situated in the flow of particulate material and has a weighing cell which is made up of a tubular wall defined between an internal face and an external face, the weighing cell having a volume of predetermined value, a cross section of predetermined value, a weight of predetermined value and being disposed to be passed through by the flow of particulate material, a first apparatus which, at least during a first predetermined time interval, weighs the whole made up of the weighing cell and a quantity of particulate material contained in the weighing cell, and produces a first signal representing at least the value of the weight of the whole made up of the weighing cell and the quantity of particulate material contained in said weighing cell, a second apparatus which, at least during the first predetermined time interval, measures the speed of flow of the particulate material which flows through the weighing cell and produces a second signal representing the speed of flow of the particulate material contained in said weighing cell, a third apparatus which uses the first signal, the second signal, the predetermined value of the volume of the weighing cell, the predetermined value of the cross section of said weighing cell and the weight of predetermined value of the weighing cell to calculate the bulk density of the particulate material, calculate the mass flow rate of particulate material which flows through the weighing cell during the first predetermined time interval, and produce a third signal representing the mass flow rate of particulate material which flows through the weighing cell during the first predetermined time interval.

BRIEF DESCRIPTION OF THE DRAWING

The invention will be better understood from reading the following description, given by way of non-limiting example, with reference to the attached drawing, in which:

FIG. 1 shows a device for measuring a mass flow rate of a particulate material seen in transverse section according to a substantially vertical plane.

DETAILED DESCRIPTION OF THE PREFERRED EMBODIMENTS

Referring to the drawing, one sees a first device, said device 1 for measuring a mass flow rate DM of a flow 40 of particulate material 3 which moves in a predetermined direction which is a predetermined direction of flow 63.

In a notable but non-limiting manner the particulate material 3 is intended to be introduced in a second device 5, such an extruder.

According to the invention the device 1 for measuring a mass flow rate 1 is situated in the flow 40 of particulate material 3 and has:

a weighing cell 6 which is made up of a tubular wall 60 defined between an internal face 61 and an external face 62, this weighing cell 6 having a volume of predetermined value V, a cross section of predetermined value C, a weight of predetermined value W and being disposed to be passed through by the flow 40 of particulate material 3, a first apparatus 7 which, at least during a first predetermined time interval Z, weighs the whole made up of the weighing cell 6 and a quantity of particulate material 3 contained in this weighing cell 6, and produces a first signal S1 representing at least the value P of the weight of the whole made up of the weighing cell 6 and the quantity of particulate material 3 contained in said weighing cell 6, a second apparatus 8 which, at least during the first predetermined time interval Z, measures the speed of flow E of the particulate material 3 which flows through the weighing cell 6 and produces a second signal S2 representing the speed of flow E of the particulate material 3 contained in said weighing cell 6, a third apparatus 9 which uses the first signal S1, the second signal S2, the predetermined value V of the volume of the weighing cell 6, the predetermined value C of the cross section of said weighing cell 6 and the weight of predetermined value W of the weighing cell 6 to calculate the bulk density Q of the particulate material 3, calculate the mass flow rate DM of particulate material 3 which flows through the weighing cell 6 during the first predetermined time interval Z, and produce a third signal S3 representing the mass flow rate DM of particulate material 3 which flows through the weighing cell 6 during the first predetermined time interval Z.

In a preferable but non-limiting manner, the flow 40 of particulate material 3 which moves in the predetermined direction of flow 63, is moving through a pipe 4 and is going out of said pipe 4 through an opening, said third opening 41 which is situated at an end 42 of the pipe 4.

The device 1 for measuring a mass flow rate is situated downstream from the third opening 41 of said pipe 4.

The word "pipe" designates any apparatus intented to convey the granular material upstream to the device 1 for measuring the mass flow.

Notably, the weighing cell 6 has a tubular wall 60 at least locally transparent in order to allow observation, from outside this weighing cell 6, of the particulate material 3 which flows against its internal face 61, and the second apparatus 8 has:

a fourth apparatus 10 to capture and register, through the tubular wall 60, during at least the first predetermined time interval Z, two successive images of the particulate material 3 in contact with the internal face 61 of the wall 60 of the weighing cell 6, these two successive images constituting a group 2 of a first image 201 and a second image 202, a fifth apparatus 11 to compare the first image 201 and the second image 202 of the group 2 of two successive images, and determine the value of a displacement L of the particulate material 3 during the first predetermined time interval Z, and produce a fourth signal S4 representing the value L of the displacement of the particulate material 3 which flows through the weighing cell 6 during the first predetermined time interval Z, a sixth apparatus 12 to use the fourth signal S4 and, as a function of the value of the first predetermined time interval Z, calculate the speed of flow E of the particulate material 3 which flows through the weighing cell 6 and produce the second signal S2 representing the speed of flow E of the particulate material 3 contained in said weighing cell 6.

In the drawing, the reference symbol "P" for the value P of the weight of the whole made up of the weighing cell 6 and the particulate material 3 contained in said weighing cell 6 is associated with the reference symbol "S1" for the first signal S1, the reference symbol "E" for the speed flow E is associated with the reference symbol "S2" for the second signal S2, the reference symbol "DM" for the mass flow rate is associated with the reference symbol "S3" for the third signal S3, the reference symbol "L" for the displacement L is associated with the reference symbol "S4" for the fourth signal S4.

The third signal S3 may, for example, be directed to a seventh apparatus 13 for registering the values of this third signal during a predetermined period.

One skilled in the art is able to take these measures to fulfil this function.

Since the particulate material has a certain bulk density Q calculated by apparatus 9, and the weighing cell 6 also has a cross section of known value C, the value of the mass flow rate DM during the first predetermined time interval Z is a function of the value of the speed of flow E and of the value of the bulk density Q.

Notably, the first apparatus 7 which weighs the whole made up of the weighing cell 6 and the quantity of particulate material 3 contained in this weighing cell 6:

obtains a plurality of weights during the first predetermined time interval Z, and produces a first signal S1 representing the average weight of the whole made up of the weighing cell 6 and the quantity of particulate material 3 contained in said weighing cell 6 during said first predetermined time interval Z.

Likewise in a notable way:

the fourth apparatus 10 captures and registers regularly, during the first predetermined time interval Z, successive images of the particulate material 3 which flows through the weighing cell 6, and the fifth apparatus 11 compares regularly the first image 201 and the second image 202 of each group 2 of two successive images to produce the fourth signal S4 representing the value L of the displacement of the particulate material 3 which flows through the weighing cell 6 during the first predetermined time interval Z.

The fourth apparatus 10 has a video camera 100 and an image grabber 101.

The fifth apparatus 11 has an image processing system 110 which analyzes the first image 201 and the second image 202 in order to determine the displacement of the particles 30 during the first predetermined time interval Z.

One skilled in the art is also able to take these last-mentioned measurements to fulfil these functions.

One sees that the proposed device for measuring a mass flow rate combines weight measurement with optical measurements of the translation rate of the particulate material 3 which flows through the weighing cell 6.

In a preferable but non limiting manner, the weighing cell 6 is oriented in such a way that the particulate material 3 flows vertically in this weighing cell 6, but such a vertical flow is not mandatory.

One knows that in the case of a tubular wall 60 filled with particulate material 3, the displacement of said particulate material 3 is coherent at a reasonable distance from both ends of the tubular wall 60, i.e. all the particles 30 making up said particulate material 3 displace themselves at the same speed as if these particles 30 constituted a block.

Notably the weighing cell 6 has:

a first opening 64 for admission of the particulate material 3 in the weighing cell 6 and a second opening 65 for exit of the particulate material 3 from the weighing cell 6 and a first element 66 which, situated at the level of the first opening 64, allows the flow of particulate material in the weighing cell 6 by limiting to a minimal value the action exerted upon the weighing cell 6 by the particulate material 3 situated upstream from said weighing cell 6, a second element 67 which, situated at the level of the third opening, limits to a minimal value the interaction between weighing cell 6 and the particular material 3 which is situated downstream the said weighing cell 6.

Also in a notable way, the wall 60 of the weighing cell 6 is at least partially made up of a material 68 which is selected in such a way that the coefficient of friction between the internal face 61 of the weighing cell 6 and the particulate material 3 has a value as low as possible so that the particles 30 in contact with said internal face 61 do not undergo relative displacement with respect to one another.

In the drawing, by way of example, the first apparatus, the second apparatus, the third apparatus, the fourth apparatus, the fifth apparatus, the sixth apparatus and the seventh apparatus are represented as being functional blocks which receive signals and inputs and/or product signals.

In the drawing, the known value of the first predetermined time interval Z, the value of density Q, the predetermined value V of the volume of the weighing cell 6, the predetermined value C of the cross section of said weighing cell 6 and the weight of predetermined value W of the weighing cell 6 are respectively represented by the letters Z, Q, V, C W.

These values are considered as being inputs and are represented as being arrows which are attached to the appropriate reference numerals or symbols.

In a noteworthy way:
the first element 66 has
a first part 660 which, situated axially with respect to the first opening 64 and upstream from this first opening 64, in relation to the predetermined direction of flow 63 of the particulate material 3,
has a predetermined shape and a predetermined first cross section to bring about a first stream of particulate material 3,
having a second cross section with a first axial hollow space,
a second part 661 which, situated peripherally with respect to the first opening 64 and at the level thereof,
has a predetermined shape and a predetermined third cross section to transform the first stream of second cross section into a second stream which is of fourth cross section substantially equal to said first cross section,
the second element has
a third part 670 which, situated axially with respect to the second opening 65 and upstream from this second opening 65, in relation to the predetermined direction of flow 63 of the particulate material 3,
has a predetermined shape and a predetermined fifth cross section to bring about a third stream of particulate material 3 having a sixth cross section with a second axial hollow space,
a fourth part 671 which, situated peripherally with respect to the second opening 65 and at the level thereof,
has a predetermined shape and a predetermined seventh cross section
to transform the third stream of sixth cross section into fourth flow which is of eighth cross section substantially equal to said fifth cross section.

According to the invention the device 1 for measuring a mass flow rate is situated between the opened end 41 of the said pipe 4 and an opening 51, said fourth opening 51, of the second device 5.

In a preferable but non-limitative manner:
the first cross section, the fourth cross section and the eighth cross section are circular, and
the second cross section and the sixth cross section are annular.

The invention claimed is:
1. Device for measuring a mass flow rate of a flow of particulate material which flows in a predetermined direction, the device being situated in the flow of particulate material, the device comprising:
a weighing cell that includes a tubular wall defined between an internal face and an external face, the tubular wall of the weighing cell being at least locally transparent in order to allow observation, from outside the weighing cell, of the particulate material which flows against an internal face of the tubular wall, the weighing cell having a volume of predetermined value, a cross section of predetermined value, and a weight of predetermined value, the weighing cell being disposed to be passed through by the flow of particulate material;
a first apparatus which, at least during a first predetermined time interval,
weighs a total weight of the weighing cell and a quantity of particulate material contained in the weighing cell, and
produces a first signal representing at least the value of the total weight of the weighing cell and the quantity of particulate material contained in the weighing cell,
a second apparatus which, at least during the first predetermined time interval, measures the speed of flow of the particulate material through the weighing cell and produces a second signal representing the speed of flow of the particulate material contained through the weighing cell, wherein the second apparatus includes a fourth apparatus to capture and register, through the tubular wall, during at least the first predetermined time interval, two successive images of the particulate material in contact with the internal face of the tubular wall of the weighing cell, the two successive images constituting a group of a first image and a second image; and
a third apparatus which uses the first signal, the second signal, the predetermined value of the volume of the weighing cell, the predetermined value of the cross section of the weighing cell and the predetermined value of the weight of the weighing cell to
calculate the bulk density of the particulate material,
calculate the mass flow rate of particulate material which flows through the weighing cell during the first predetermined time interval, and
produce a third signal representing the mass flow rate of particulate material which flows through the weighing cell during the first predetermined time interval.

2. Device according to claim 1, wherein the second apparatus further includes:
a fifth apparatus to compare the first image and the second image of the group of two successive images, to determine a value of a displacement of the particulate material during the first predetermined time interval, and to produce a fourth signal representing the value of the displacement of the particulate material which flows through the weighing cell during the first predetermined time interval; and
a sixth apparatus that uses the fourth signal and the value of the first predetermined time interval to calculate the speed of flow of the particulate material which flows through the weighing cell, and to produce the second signal representing, the speed of flow of the particulate material contained in the weighing cell.

3. Device according to claim 1, wherein the first apparatus which weighs the total weight of the weighing cell and the quantity of particulate material contained in the weighing cell:
obtains a plurality of weights during the first predetermined time interval, and produces the first signal representing the average total weight of the weighing cell and the quantity of particulate material contained in the weighing cell during the first predetermined time interval.

4. Device according to claim 1, wherein:

a fifth apparatus compares regularly the first image and the second image of each group of two successive images to produce a fourth signal representing the value of a displacement of the particulate material which flows through the weighing cell during the first predetermined time interval.

5. Device according to claim 1, wherein, the weighing cell further comprises:

a first opening for admission of the particulate material in the weighing cell and a second opening for exit of the particulate material from the weighing cell; and a first element which, situated at the level of the first opening, allows the flow of particulate material in the weighing cell by limiting to a minimal value the action exerted upon the weighing cell by the particulate material situated upstream from the weighing cell; and a second element which, situated at the level of the second opening, limits to a minimal value the interaction between weighing cell and the particular material which is situated downstream the weighing cell.

6. Device according to claim 5, wherein the first element further comprises:

a first part which, situated axially with respect to the first opening and upstream from the first opening, in relation to the predetermined direction of flow of the particulate material, has a predetermined shape and a predetermined first cross section to bring about a first stream of particulate material, having a second cross section with a first axial hollow space, and a second part which, situated peripherally with respect to the first opening and at a level of the first opening, has a predetermined shape and a predetermined third cross section to transform the first stream of second cross section into a second stream which is of a fourth cross section substantially equal to the first cross section; and the second element further comprises:

a third part which, situated axially with respect to the second opening and upstream from the second opening, in relation to the predetermined direction of flow of the particulate material, has a predetermined shape and a predetermined fifth cross section to bring about a third stream of particulate material having a sixth cross section with a second axial hollow space, and a fourth part which, situated peripherally with respect to the second opening and at a level of the second opening, has a predetermined shape and a predetermined seventh cross section to transform the third stream of sixth cross section into a fourth flow which is of an eighth cross section substantially equal to the fifth cross section.

7. Device according to claim 1, wherein the tubular wall of the weighing cell at least partially comprises a material selected such that a coefficient of friction between the internal face of the tubular wall of the weighing cell and the particulate material to allow the particles in contact with the internal face to not undergo relative displacement with respect to one another.

8. Device according to claim 1, further comprising a pipe situated upstream of the weighing cell, through which the particulate material flows, the particulate material exiting the pipe through an opening at an end of the pipe.

9. Device according to claim 8, further comprising a second device into which the particulate material introduced, the second device extruding the particulate material, wherein the weighing cell is situated between the opening at the end of the pipe and an opening in the second device.

* * * * *